United States Patent Office 3,491,098
Patented Jan. 20, 1970

3,491,098
1-[(IMIDAZOLYL)-LOWER-ALKYL]-4-
SUBSTITUTED-PIPERAZINES
Sydney Archer, Bethlehem, N.Y., assignor to Sterling
Drug Inc., New York, N.Y., a corporation of Delaware
No Drawing. Continuation-in-part of application Ser. No.
481,075, Aug. 19, 1965, which is a continuation-in-part
of application Ser. No. 254,475, Jan. 28, 1963. This application May 29, 1967, Ser. No. 642,172
Int. Cl. C07d 57/24; A61k 27/00
U.S. Cl. 260—268                                3 Claims

ABSTRACT OF THE DISCLOSURE

New 1-[(imidazolyl)-lower-alkyl]-4-substituted-piperazines useful as tranquilizers, sedatives, skeletal muscle relaxants, adrenolytics, hypothermic agents, anti-convulsants, hypotensives, and cardiovascular agents.

---

This application is a continuation-in-part of my copending application Ser. No. 481,075, filed Aug. 19, 1965, now U.S. 3,362,956 granted Jan. 9, 1968, which in turn is a continuation-in-part of my prior application Ser. No. 254,475, filed Jan. 28, 1963, and now abandoned.

This invention relates to certain 1-[(imidazolyl)-lower-alkyl]-4-substituted-piperazines, their acid-addition and quaternary ammonium salts, and to intermediates and processes therefor.

The compounds of the invention are represented by the general formula:

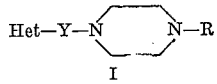

I wherein R is hydrogen or a lower-alkyl, hydroxy-lower-alkyl, phenyl, phenyl-lower-alkyl, benzhydryl, phenyl-lower-alkenyl, cycloalkyl-lower-alkyl, or pyridyl radical; Y is lower-alkylene of from one to six carbon atoms; and Het is a 4(5)-imidazolyl radical.

In the above general Formula I, when R represents a lower-alkyl radical, it can be straight or branched and can contain from one to about six carbon atoms and thus stands, inter alia, for methyl, ethyl, isobutyl, n-hexyl, and the like.

When R represents an hydroxy-lower-alkyl radical, it can be straight or branched, can contain from two to six carbon atoms and is such that the oxygen atom of the hydroxy-lower-alkyl group and the nitrogen atom of the piperazine ring are separated by at least two carbon atoms. R thus also stands, inter alia, for 2-hydroxyethyl, 3-hydroxy-1-methylpropyl, 6-hydroxyhexyl, and the like.

When R represents cycloalkyl-lower-alkyl, the cycloalkyl moiety contains from three to seven ring carbon atoms. R thus also stands for cyclopropylmethyl, cyclobutylmethyl, cyclopentylmethyl, cycloheptylmethyl, 2-cyclohexylethyl, and the like.

When R represents phenyl, phenyl-lower-alkyl, benzhydryl, or phenyl-lower-alkenyl, the benzene ring of said radicals can be unsubstituted or can bear one or more substituents of low molecular weight and of such nature that they do not interfere with or take part in the reactions to be described hereinafter, used in the preparation of the compounds. Examples of such substituents include halogen (including fluorine, chlorine, bromine, and iodine), lower-alkyl, hydroxy, lower-alkoxy, methylenedioxy, ethylenedioxy, lower-alkylmercapto, lower-alkylsulfinyl, lower-alkyl-sulfonyl, nitro, lower-alkanoyl, sulfamyl, trifluoromethyl, and the like. When R represents a phenyl-lower-alkyl radical, the lower-alkyl moiety of said radical can contain from one to four carbon atoms, and when R represents a phenyl-lower-alkenyl radical, the lower-alkenyl moiety of said radical can contain from three to four carbon atoms. Thus R represents, inter alia, phenyl, benzyl, phenethyl, 4-phenylbutyl, benzhydryl, or cinnamyl, or such radicals substituted in the benezene ring by one or more substituents of the nature described above.

In the above general Formula I, the group Y represents lower-alkylene of from one to six carbon atoms, and can be straight or branched. The lower-alkylene group, Y, thus stands, inter alia, for methylene, 1,2-ethylene, 1,3-propylene, 2-methyl-1,4-butylene, 1,6-hexylene, and the like.

The compounds of Formula I can also be substituted on the carbon atoms of the piperazine ring by one or more lower-alkyl radicals each containing from one to four carbon atoms.

The compounds of Formula I can be prepared by one or more of the following reactions in which Het, R, and Y have the meanings given above, Hal represents a halogen atom, Alk represents a lower-alkyl radical, and Y' is a single bond or lower-alkylene containing from one to five carbon atoms.

Method A:

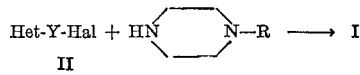

Method B:

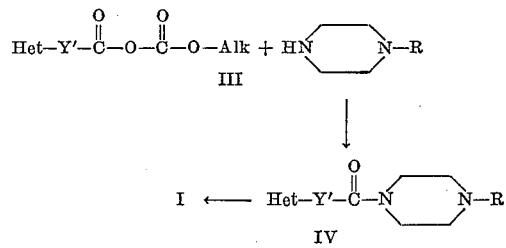

Method C:

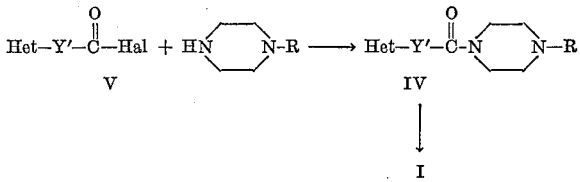

Method D:

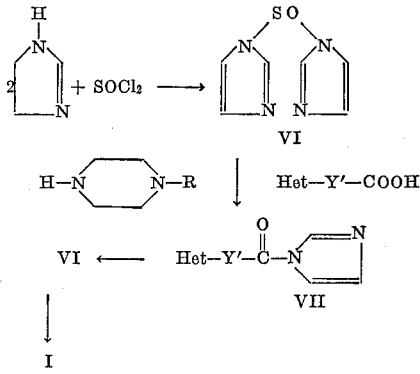

Method E:

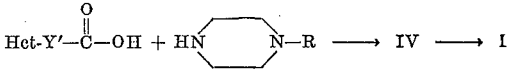

In Method A above, an (imidazolyl)-lower-alkyl halide is reacted with an appropriate 1-substituted-piperazine. The reaction is preferably carried out at a temperature between about 50° C. to 150° C. in the presence of an acid-acceptor in an organic solvent inert under the conditions of the reaction, for example anhydrous ethanol, benzene, xylene, and the like. The purpose of the acid-acceptor is to take up the hydrogen halide which is split out during the course of the reaction. It is a basic substance which forms preferably water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the 1-substituted-piperazine.

In Method B above, an (imidazolyl)-lower-alkane mixed anhydride of Formula III is reacted with an appropriate 1-substituted-piperazine to give the 1-[(imidazolyl)-lower-alkanoyl]-4-substituted-piperazines of Formula IV, preferably at a temperature between about −20° C. and about 20° C. The latter, on reaction with an alkali metal aluminum hydride, preferably at a temperature between about 0° C. and about 65° C. in an organic solvent inert under the conditions of the reaction, for example ether or tetrahydrofuran, affords the compounds of Formula I. It is preferred to use lithium aluminum hydride in refluxing tetrahydrofuran. The intermediate mixed anhydrides of Formula III used as starting materials in Method B are prepared by reacting an (imidazolyl)-lower-alkanoic acid with a lower-alkyl haloformate. The reaction is preferably carried out in the presence of an acid-acceptor, for example triethylamine, at a temperature between about −20° C. and about 20° C. in an organic solvent inert under the conditions of the reaction such as anhydrous acetone, ether, ethylene dichloride, and the like. Acetone is a preferred solvent. The acid-acceptor, which takes up the hydrogen halide split out during the course of the reaction, is preferably a basic substance which forms water-soluble by-products easily separable from the product.

In Method C above, an (imidazolyl)-lower-alkanoyl halide of Formula V is reacted with a 1-substituted-piperazine to give the 1-[(imidazolyl)-lower-alkanoyl]-4-substituted-piperazines of Formula IV. The reaction is preferably carried out at a temperature in the range from about −5° C. to 65° C. in the presence of an acid-acceptor in an organic solvent inert under the conditions of the reaction, such as tetrahydrofuran, ether, ethylene dichloride, and the like. The purpose and nature of the acid-acceptor are the same as that described above in the description of Method A. The 1-[(-imidazolyl)-lower-alkanoyl]-4-substituted-piperazines of Formula IV thus prepared are then reduced with an alkali metal aluminum hydride as described above in the description of Method B.

The 1-[(imidazolyl)-lower-alkanoyl]-4-substituted-piperazines of Formula IV can also be prepared according to Methods D or E. In Method D, N,N'-thionyldiimidazole of Formula VI is first prepared by reacting imidazole with thionyl chloride. The former is then reacted with an imidazolyl-lower-alkanoic acid, and the resulting N-(imidazolyl-lower-alkanoyl)imidazole of Formula VII is reacted with a 1-substituted-piperazine to produce the 1-[(imidazolyl)-lower-alkanoyl]-4-substituted-piperazines of Formula IV. If desired the N,N'-thionyldiimidazole and the N-(imidazolyl-lower-alkanoyl)imidazole intermediates can be isolated prior to reaction in the next succeeding step, but it is advantageous to carry out the entire sequence of steps up to the formation of the 1-[-imidazolyl)-lower-alkanoyl]-4-substituted-piperazines of Formula IV in essentially one operation, that is by reacting each intermediate, without isolation, with the next succeeding reactant using the same solvent medium for the entire sequence of reactions. Suitable solvents are organic solvents inert under the conditions of the reactions, for example tetrahydrofuran, diethyl ether, dibutyl ether, and the like. The reactions are preferably conducted at a temperature in the range from about −10° C. to about 50° C.

Alternatively the 1-[(imidazolyl)-lower-alkanoyl]-4-substituted piperazines of Formula IV can be prepared according to Method E. This method requires the direct interaction of an (imidazolyl)-lower-alkanoic acid with a 1-substituted-piperazine. The reaction is preferably conducted by a direct fusion of the acid and the amine in the absence of any solvent and at a temperature sufficiently high to expel the water formed in the reaction. For this purpose, a temperature in the range from about 130° C. to 350° C. is suitable.

The 1-[(imidazolyl)-lower-alkanoyl]-4-substituted-piperazines of Formula IV produced in each of Methods D and E are then reduced with an alkali metal aluminum hydride to the final products of Formula I as described above in the description of Method B.

The novel compounds of the instant invention are the bases of Formula I and the acid-addition and quaternary ammonium salts of said bases, and said acid-addition and quaternary ammounium salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluene-sulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammounium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be prepared.

It will thus be appreciated that Formula I not only represents the structural configuration of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-[(imidazoyly)-lower-alkyl]-4-substituted-piperazines and not in any particular acid or quaternary moiety of acid anion associated with the salt forms of my compounds; rather, the acid or quaternary moieties or anions which can be associated in the salt forms are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and poly-sulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, iso- butyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I has demonstrated that they possess a variety of depressant actions on the autonomic nervous system, the cardiovascular system, and the skeletal muscle system. They depress psychomotor activity as evidenced by studies in mice in standard activity cages; they possess sedative activity as shown by the potentiation of sleeping time in mice induced by ether, thiopental sodium or hexobarbital sodium. They show skeletal muscle relaxant activity in mice in the inclined screen test. When administered to rats, they show adrenolytic activity as evidenced by antagonism of the pressor effects of epinephrine; they lower the rectal temperature in mice; they possess anticonvulsant activity in mice as evidenced by their ability to protect mice from pentylenetetrazol-induced convulsions; they lower the blood pressure in rats; and they show cariovascular activity in dogs as evidenced by the increase in heart force. These activities indicate their usefulness as tranquilizers, sedatives, skeletal muscle relaxants, adrenolytic agents, hypothermic agents, anti-convulsants, hypotensive agents, and cardiovascular agents.

Thus in psychomotor activity depressant studies in mice 1-{2-[4(5) - imidazolyl]ethyl} - 4 - phenylpiperazine, described below in Example 1, was found to have an $ED_{50}$ of $21\pm5.5$ mg./kg. on oral administration. The same compound, in sedative activity studies in mice was found to have an $ED_{50}$ of $4.52\pm0.97$ mg./kg. on intraperitoneal administration.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

1-{2-[4(5)-imidazolyl]ethyl}-4-phenylpiperazine [I: Het is 4(5)-imidazolyl; Y is $CH_2CH_2$; R is $C_6H_5$]

To a solution of 50.6 g. (0.241 mole) of histidine hydrochloride in 125 ml. of water at about 20° C. was added, over a period of about ninety minutes, 630 ml. of 5.25% aqueous sodium hypochlorite. When addition was complete, the reaction mixture was stirred for three hours, the pH adjusted to 8.0 with solid sodium carbonate, and the reaction mixture concentrated to dryness. The residue was extracted with boiling ethyl acetate and the combined extracts evaporated to dryness. The residue was recrystallized from ethyl acetate giving 4(5)-cyanomethylimidazole, M.P. 130° C.

Thirteen grams of the 4(5)-cyanomethylimidazole were suspended in 100 ml. of 2 N sodium hydroxide, the mixture refluxed for three and a half hours under nitrogen, acidified by addition of hydrochloric acid, and concentrated to dryness. The residue was extracted with boiling ethanol, and the extracts, on cooling, yielded 17 g. of [4(5)-imidazolyl]acetic acid hydrochloride, M.P. 220–224° C. (uncorr.).

To a mixture of 17 g. of phosphorus pentachloride and 21 ml. of thionyl chloride heated to 60° C. was added, in portions over a period of ten minutes, 13.5 g. of the [4(5)-imidazolyl]acetic acid hydrochloride obtained above. The reaction mixture was heated to about 60–65° C. for ninety minutes, then cooled and diluted with chloroform. The resulting brown solid which separated was collected and dried in vacuo giving 13.5 g. of [4(5)-imidazolyl]acetyl chloride, M.P. 119–124° C. The latter was reacted with 39 g. (0.24 mole) of 1-phenylpiperazine in 250 ml. of tetrahydrofuran. The temperature of the reaction mixture rose to 40° C., and the mixture was stirred for an hour and a half, cooled, and filtered. The filtrate was taken to dryness giving a black oil which was recrystallized once from acetone and once from water to give 4.7 g. of 1-{[4(5)-imidazolyl]acetyl}-4-phenylpiperazine, M.P. 175–177° C. (uncorr.).

The above 1-{[4(5)-imidazolyl]acetyl}-4-phenylpiperazine was reduced with 4.0 g. (0.10 mole) of lithium aluminum hydride in 100 ml. of tetrahydrofuran by refluxing the mixture for about six hours. The mixture was then cooled, the excess lithium aluminum hydride decomposed by addition of 24 ml. of water, the solid removed by filtration and the filtrate taken to dryness. The residual solid was recrystallized once from ethyl acetate and once from water giving 2.6 g. of 1-{2-[4(5)-imidazolyl]ethyl}-1-phenylpiperazine, M.P. 164.0–165.2° C. (corr.).

1-{2-[4(5)-imidazolyl]ethyl}-4-phenylpiperazine can be reacted with hydriodic acid to form 1-{2-[4(5)-imidazolyl]ethyl}-4-phenylpiperazine hydriodide, useful as a characterizing intermediate.

1-{2-[4(5)-imidazolyl]ethyl}-4-phenylpiperazine, in the form of its hydriodide salt, can be converted to the hydrochloride salt by passing an aqueous solution of the former over an ion-exchange resin saturated with chloride ions.

1-{2-[4(5)-imidazolyl]ethyl}-4-phenylpiperazine can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, 1-{2-[4(5)-imidazolyl]ethyl}-4-phenylpiperazine can be recovered in purified free base form.

EXAMPLES 2–24

By reacting [4(5)-imidazolyl]acetyl chloride with an appropriate 1-substituted-piperazine and reducing the resulting substituted 1-{[4(5)-imidazolyl]acetyl}-4-substituted-piperazine with lithium aluminum hydride in tetrahydrofuran according to the manipulative procedure described above in Example 1, there can be obtained the compounds of Formula I in Table 1 below where, in each instance, Het is 4(5)-imidazolyl, and Y is $CH_2CH_2$.

TABLE 1

| Example | R | Piperazine substituent |
|---|---|---|
| 2 | $CH_3$ | |
| 3 | $HOCH_2CH_2$ | |
| 4 | $4\text{-}ClC_6H_4$ | |
| 5 | $3\text{-}CH_3C_6H_4$ | 2-$CH_3$ |
| 6 | $4\text{-}HOC_6H_4$ | |
| 7 | $2\text{-}CH_3OC_6H_4$ | 6-$CH_3$ |
| 8 | $3,4\text{-}OCH_2OC_6H_3$ | 3-$CH_3$ |
| 9 | $3,4\text{-}OCH_2CH_2OC_6H_3$ | 6-$CH_3$ |
| 10 | $4\text{-}CH_3SC_6H_4$ | 2-n-$C_4H_9$ |
| 11 | $4\text{-}CH_3SOC_6H_4$ | 3-$CH(CH_3)_2$ |
| 12 | $4\text{-}CH_3SO_2C_6H_4$ | 2,2-di-$CH_3$ |
| 13 | $4\text{-}CF_3C_6H_4$ | 2,5-di-$CH_3$ |
| 14 | $4\text{-}NO_2C_6H_4$ | 2-$CH_3$ |
| 15 | $3\text{-}CH_3COC_6H_4$ | |
| 16 | $4\text{-}NH_2SO_2C_6H_4$ | |
| 17 | $3,4,5\text{-}(CH_3O)_3C_6H_2$ | |
| 18 | $2\text{-}Cl\text{-}4\text{-}CH_3C_6H_3$ | |
| 19 | $C_6H_5CH_2$ | 2,6-di-$CH_3$ |
| 20 | $C_6H_5CH=CHCH_2$ | 3,6-di-$CH_3$ |
| 21 | $(C_6H_5)_2CH$ | 2,5-di-n-$C_3H_7$ |
| 22 | $2\text{-}C_5H_4N$ | |
| 23 | $C_9H_{11}CH_2$ | |
| 24 | $C_3H_5CH_2$ | |

EXAMPLE 25

1-{2-[4(5)-imidazolyl]ethyl}piperazine [I: Het is 4(5)-imidazolyl; Y is $CH_2CH_2$; R is H]

By reducing the 1-{2-[4(5)-imidazolyl]ethyl}-4-benzyl-2,6-dimethylpiperazine described above in Example 19, with hydrogen over a palladium-on-charcoal catalyst in an ethanol solvent, there is obtained 1-{2-[4(5)-imidazolyl]-ethyl}piperazine.

EXAMPLES 26–28

By following the manipulative procedure described above in Example 1, substituting for the [4(5)-imidazolyl]-acetyl chloride used therein a molar equivalent amount of an appropriate [4(5)-imidazolyl]-lower-alkanoyl halide, there can be obtained the compounds of Formula I in Table 2 below where, in each instance, Het is 4(5)-imidazolyl, and R is phenyl.

TABLE 2

| Example | Y |
|---|---|
| 26 | $CH_2$ |
| 27 | $(CH_2)_3$ |
| 28 | $(CH_2)_4$ |

EXAMPLE 29

1-{6-[4(5)-imidazolyl]hexyl}-4-phenylpiperazine [I: Het is [4(5)-imidazolyl]; Y is $(CH_2)_5$; R is $C_6H_5$]

By reduction of $\gamma$-[4(5)-imidazolyl]butyric acid with lithium aluminum hydride using the manipulative procedure described above in Example 1, there is obtained 4-[4(5)-imidazolyl]butanol.

Reaction of the latter with thionyl chloride in the presence of pyridine at a temperature of from 20 to 70°C. affords 4-[4(5)-imidazolyl]butyl chloride.

Reaction of the latter with diethyl malonate in the presence of sodium ethoxide, and saponification of the product with dilute sulfuric acid gives $\omega$-[4(5)-imidazolyl]hexanoic acid.

Conversion of the latter to the corresponding acid chloride with thionyl chloride, reaction of the acid chloride with 1-phenylpiperazine, and lithium aluminum hydride reduction of the resulting 1-{$\omega$[4(5)-imidazolyl]hexanoyl}-4-phenylpiperazine, all according to the procedure described above in Example 1, affords 1-{6-[4(5)-imidazolyl]hexyl}-4-phenylpiperazine.

I claim:
1. A compound of the formula

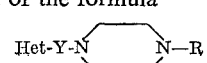

wherein Het is 4(5)-imidazolyl; R is a hydrogen atom or lower-alkyl, hydroxy-lower-alkyl, phenyl, phenyl-lower-alkyl, benzhydryl, phenyl-lower-alkenyl, cycloalkyl-lower-alkyl having from three to seven ring carbon atoms, or pyridyl; and Y is lower-alkylene of from one to six carbon atoms and wherein the benzene ring of the phenyl, phenyl-lower-alkyl, benzhydryl, and phenyl-lower-alkenyl moieties is unsubstituted or bears a methylenedioxy or ethylenedioxy substituent attached to adjacent carbon atoms, a nitro substituent, or from one to three substituents selected from the group consisting of halogen, lower-alkyl, hydroxy, lower-alkoxy, lower-alkylmercapto, lower-alkyl-sulfinyl, lower-alkylasulfonyl, lower-alkanoyl, sulfamyl, and trifluoromethyl.

2. A compound according to claim 1 wherein R is phenyl.

3. 1-{2-[4(5)-imidazolyl]ethyl}-4-phenylpiperazine according to claim 2 wherein Y is 1,2-ethylene.

References Cited

UNITED STATES PATENTS

| | | | |
|---|---|---|---|
| 3,331,843 | 7/1967 | Tomcufcik et al. | 260—268 |
| 3,367,936 | 2/1968 | Koppe et al. | 260—268 |
| 3,374,237 | 3/1968 | Wright et al. | 260—268 |

DONALD G. DAUS, Primary Examiner

U.S. Cl. X.R.

260—309; 252, 690; 424—250

UNITED STATES PATENT OFFICE
CERTIFICATE OF CORRECTION

Patent No. 3,491,098        Dated January 20, 1970

Inventor(s) Sydney Archer

It is certified that error appears in the above-identified patent and that said Letters Patent are hereby corrected as shown below:

Column 1, line 21, delete "alkyl]-4-substituted-piperazines, their acid-addition and"; line 27, insert --alkyl]-4-substituted-piperazines, their acid-addition and--; and line 36, "pheny" should read --phenyl--. Column 2, line 4, "benezene" should read --benzene--. Column 3, line 67, "[-imidazolyl)" should read --[(imidazolyl)--. Column 4, lines 21 and 59, "ammounium" should read --ammonium--. Column 5, line 41, "(imidazoyly)" should read --(imidazolyl)--. Column 6, line 42, "cariovascular" should read --cardiovascular--. Column 8, line 51, "$(CH_2)_5$" should read --$(CH_2)_6$--. Column 9, line 13, "lower-alkylasulfonyl" should read --lower-alkylsulfonyl--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents